Figure 1:
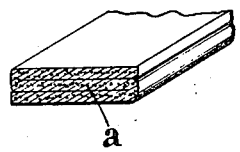

G. H. COOK.
STUFFING BOX PACKING.
APPLICATION FILED OCT. 23, 1914.

1,171,090.

Patented Feb. 8, 1916.

Witnesses—
Stanley Wood
Robert Owen Hughes.

Inventor
George Henry Cook
by
W. C. Evans
Attorney.

UNITED STATES PATENT OFFICE.

GEORGE HENRY COOK, OF POPLAR, LONDON, ENGLAND.

STUFFING-BOX PACKING.

1,171,090.　　　　Specification of Letters Patent.　　Patented Feb. 8, 1916.

Application filed October 23, 1914. Serial No. 868,272.

*To all whom it may concern:*

Be it known that I, GEORGE HENRY COOK, a subject of the King of Great Britain and Ireland, residing at Lion Works, Garford street, Poplar, London, E., England, have invented certain new and useful Improvements Relating to Stuffing-Box Packing, of which the following is a specification.

This invention relates to packing for use in engines, pumps and other machines, for maintaining tight joints between rods and the stuffing boxes through which such rods pass.

The invention has for its object to employ fiber, such as asbestos fiber, cotton or flax, or fabric made therefrom for the purpose, and to produce packing which is easy of manipulation and capable of easy application in position within the stuffing box in such a manner as, while being tightly and effectively applied, will occasion a minimum of friction in use.

It has long been known to employ packing of fiber or fabric only, but such packing cannot be effectively used for stuffing boxes or glands subject to high or even moderate pressures and its general use as engine packing has long since been discarded. It has now, however, long been customary to make up packing from fabric woven from asbestos fiber, cotton or flax, in which the folds or plies of fabric are caused to adhere to each other by a solution of india-rubber, so that thus the fabric is connected by layers of a substance which renders the packing on vulcanization impervious to high pressure steam and other fluids, and imparts to it a certain solid elastic character. In use, however, such packing has been found to be unsatisfactory, first of all because it is hard and impliable while too much friction is involved in maintaining a tight joint by its means. Further, in the severe conditions obtaining in high pressure steam stuffing boxes the packing is soon de-vitalized. On continued use the packing becomes deformed and the plies or folds separate, so that thus an excessive friction is set up and the life of the packing in effective use is therefore short. To avoid these disadvantages it has been proposed to make the cloth or fabric of which the packing is composed, of asbestos or other fibers with metallic wire and to incorporate metal pins and strips of antifriction metal into the packing to give to it a metallic wearing face; so that thus notwithstanding the considerable pressure applied in the gland, which is also necessary even with this packing, excessive friction between the packing and the rod in avoided.

The present invention has for its object to produce an effective packing without the necessary use of rubber in its manufacture or of metal wearing faces, and to provide a packing that is pliable and that can be maintained in fluid tight contact by an inconsiderable pressure on the gland and which will in use occasion a minimum of friction.

Now according to the invention I make the packing of cloth or fabric woven from asbestos fiber cotton or flax and of separate folded flat-section lengths or strips, which are laid together and incased within a covering of soft metal. The separate flat-section metal-covered strips or lengths of fabric are bound together by a complete cover or envelop of cloth or fabric to form the composite packing. The separate flat-section metal-covered strips or lengths of fabric are so laid together in the packing that their faces lie parallel with the wall of the stuffing box or the rod, so that thus the composite packing while being pliable and thus easily applied in position, may be closed tightly in the stuffing box by the application of a very little pressure on the gland; while moreover each separate metal-covered part of the packing is completely surrounded and rendered impervious to the fluid which passes into the stuffing box, so that thus the natural elasticity of the fiber of the packing is not impaired throughout the life of the packing. Such packing it will be understood is of particular advantage for use, for example, in high pressure steam stuffing boxes in connection with ammonia engines, but it is also of general application and advantage wherever high efficiency and a durable packing is required.

The accompanying drawings illustrate the manner of manufacture of packing according to the invention.

Figure 2:
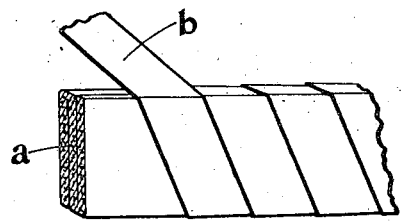
Figure 3:
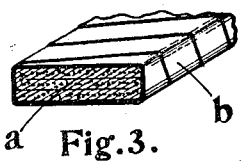
Figure 4:
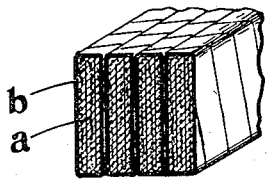
Figure 5:
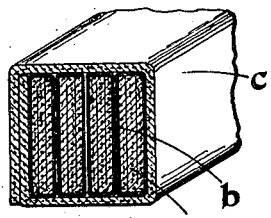
Figure 6:
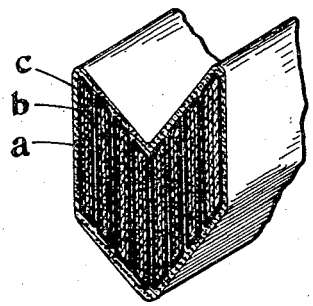
Figure 7:
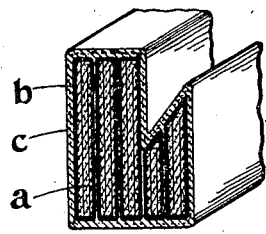

Figure 1 shows a piece of cloth or fabric twice folded to form one of the separate strips or lengths *a* of the composite packing. Fig. 2 shows the manner in which the separate strips or lengths *a* of the packing may be covered with metal in the form of a ribbon *b*. Fig. 3 shows one of the strips or lengths *a* of the packing covered with metal. Fig. 4 shows four of the metal covered strips or lengths *a* of the packing laid together to form a ring of packing. Fig. 5 represents these strips or lengths incased within an outer covering $c'$ of fabric. Fig. 6 illustrates the manner in which a length of packing of V section may be formed of separate metal-covered strips or lengths $a$, while Fig. 7 illustrates another known sectional form of packing illustrating the manner in which the separate metal-covered strips or lengths $a$ may be formed to produce a ring of that particular sectional form.

In carrying the invention into effect as illustrated in the accompanying drawings I make the packing from cloth or fabric of asbestos or other fiber such as flax or cotton, and I produce a strip of flat section advantageously by twice folding over a strip or length of the cloth in the manner indicated in Fig. 1. I then wind around this strip or length $a$, a ribbon of soft metal $b$, as indicated in Fig. 2. Such metal-covered strips or lengths of packing I employ to produce the complete composite packing of the desired size and section. The faces of the strips or lengths $a$ it will be understood lie in the composite packing parallel to the wall of the stuffing box, and all the strips or lengths $a$ forming the packing are laid side by side (Fig. 4) and are bound together in an envelop or covering $c$ (Fig. 5).

The number of separate strips or lengths constituting the packing are covered by cloth or fabric, preferably of the same kind as that used in the manufacture of the separate strips or lengths $a$. The envelop or covering $c$ is applied sufficiently loose to permit of slight displacement of the strips or lengths $a$ with respect to each other, but is advantageously of such thickness as completely to withstand the surface wear in the normal life of the packing.

The soft metal cover $b$ may be applied by winding a ribbon of metal around the separate strip or part of packing $a$ as illustrated in Fig. 2 to produce a covered strip or length as illustrated in Fig. 3, or the soft metal covering may be applied in any other convenient way.

It will be understood that by reason of the separate formation of the strips or lengths $a$ of which it is composed, the packing is so pliable as readily to be mounted in stuffing boxes no matter if the diameter of the box be small; while, moreover, the packing may be readily deformed within its envelop or covering in the closing up of the packing in the stuffing box. Further, the parts of the packing are kept impervious to the fluid which finds access to the stuffing box, and thus a durable packing is available which in use is maintained elastic and occasions a minimum of friction.

It will be understood that the invention is not confined to the production of packing of any particular form as it is possible to build up packing of any desired section in the use of separate metal-covered strips or lengths in the manner and for the purposes indicated.

Again, no limitation is involved to the use of particular fiber of which the packing is made. For hydraulic or pump work I prefer to use flax, cotton or linen cloth or yarn for the manufacture of packing; for steam stuffing boxes I prefer asbestos cloth.

What I claim as my invention and desire to secure by Letters Patent is:—

1. Packing for stuffing boxes made from cloth or fabric, consisting of a number of separate parts of folded cloth or fabric forming lengths, a soft metal covering for each of said parts and means for holding the said parts together to form a composite packing.

2. Packing for stuffing boxes made from cloth or fabric woven from asbestos, cotton, flax or other fiber, consisting of a number of separate flat section strips or lengths, a soft metal covering formed upon the said strips or lengths and means for holding the said parts together to form a composite packing.

3. Packing for stuffing boxes made from cloth or fabric woven from asbestos, cotton, flax or other fiber, and consisting of a number of separate flat section strips or lengths, a soft metal covering wound upon each of said strips or lengths and an outer covering for the strips or lengths used to form the packing.

In testimony whereof I have hereunto signed my name to this specification in the presence of two subscribing witnesses.

GEORGE HENRY COOK.

Witnesses:
   R. O. HUGHES,
   O. J. WORTH.